United States Patent
Koizumi

(10) Patent No.: US 12,156,173 B2
(45) Date of Patent: Nov. 26, 2024

(54) TERMINAL DEVICE, PROGRAM, AND COMMUNICATION CONTROL METHOD

(71) Applicant: SEIKO EPSON CORPORATION, Tokyo (JP)

(72) Inventor: Junpei Koizumi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 346 days.

(21) Appl. No.: 17/808,182

(22) Filed: Jun. 22, 2022

(65) Prior Publication Data
US 2022/0417899 A1 Dec. 29, 2022

(30) Foreign Application Priority Data
Jun. 23, 2021 (JP) .................... 2021-103915

(51) Int. Cl.
*H04W 68/00* (2009.01)
*H04W 76/11* (2018.01)
*H04W 76/14* (2018.01)

(52) U.S. Cl.
CPC .......... *H04W 68/005* (2013.01); *H04W 76/11* (2018.02); *H04W 76/14* (2018.02)

(58) Field of Classification Search
None
See application file for complete search history.

(56) References Cited

U.S. PATENT DOCUMENTS

| | | | |
|---|---|---|---|
| 9,378,634 B1* | 6/2016 | Kashyap | H04B 17/318 |
| 2018/0077494 A1* | 3/2018 | Suyama | H04L 41/0803 |
| 2019/0090296 A1* | 3/2019 | Ogawa | H04W 76/14 |
| 2019/0268955 A1* | 8/2019 | Ikeda | H04W 4/023 |
| 2020/0084313 A1* | 3/2020 | Koizumi | H04N 1/00411 |
| 2021/0306945 A1* | 9/2021 | Morimoto | H04W 84/12 |

FOREIGN PATENT DOCUMENTS

JP 2015154130 A 8/2015

* cited by examiner

*Primary Examiner* — Eunsook Choi
(74) *Attorney, Agent, or Firm* — CHIP LAW GROUP

(57) ABSTRACT

A terminal device includes a wireless communication unit that performs a wireless connection to an electronic device, and a processing unit that performs communication control of the wireless communication unit. The electronic device is capable of activating a first internal access point of a first connection method or a second internal access point of a second connection method different from the first connection method. The processing unit performs a communication connection to the first internal access point based on first connection information of the first internal access point when the first connection information is received from the electronic device. The processing unit performs notification processing when second connection information of the second internal access point is received from the electronic device.

12 Claims, 7 Drawing Sheets

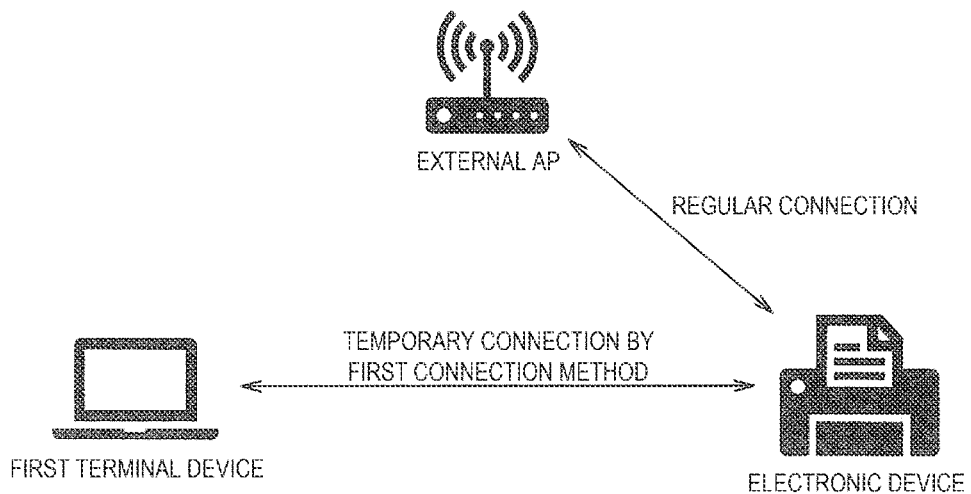
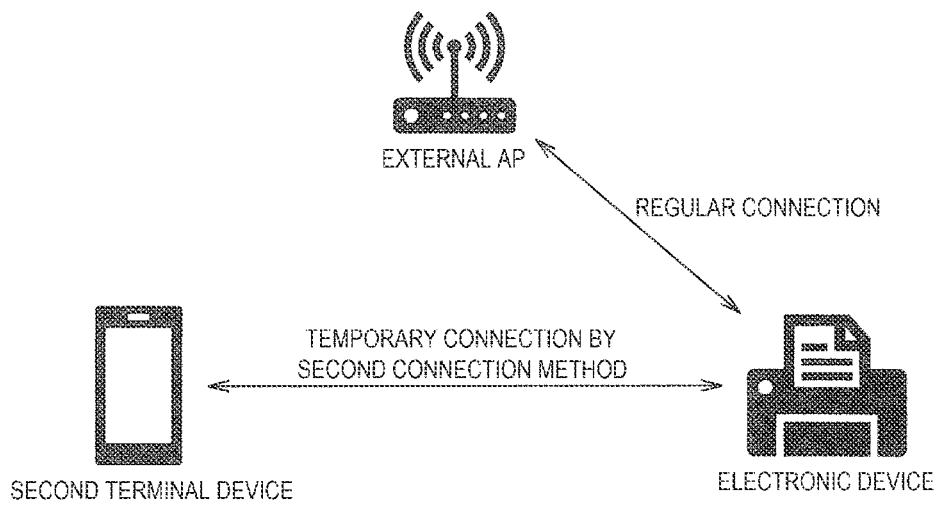

TERMINAL DEVICE, PROGRAM, AND COMMUNICATION CONTROL METHOD

The present application is based on, and claims priority from JP Application Serial Number 2021-103915, filed Jun. 23, 2021, the disclosure of which is hereby incorporated by reference herein in its entirety.

BACKGROUND

1. Technical Field

The present disclosure relates to a terminal device, a program, a communication control method, and the like.

2. Related Art

JP-A-2015-154130 discloses a technique in which a PC and a printing device establish wireless communication of a temporary connection, the PC transmits setting information of a regular connection to the printing device by the wireless communication of the temporary connection, and the printing device establishes wireless communication of the regular connection to an access point based on the received setting information of the regular connection.

When an electronic device supports a plurality of connection methods as connection methods of the wireless communication of the temporary connection, a connection method used for the temporary connection by a terminal device may be different from a connection method selected by the electronic device. In this case, for example, there is a problem that usability for a user is poor since the user is kept waiting until a time out of connection destination search.

SUMMARY

An aspect of the present disclosure relates to a terminal device including a wireless communication unit configured to perform a wireless connection to an electronic device, and a processing unit configured to perform communication control of the wireless communication unit. The electronic device is configured to activate a first internal access point of a first connection method or a second internal access point of a second connection method different from the first connection method. The processing unit is configured to perform a communication connection to the first internal access point based on first connection information of the first internal access point when the first connection information is received from the electronic device, and perform notification processing when second connection information of the second internal access point is received from the electronic device.

Another aspect of the present disclosure relates to a non-transitory computer-readable storage medium storing a program. The program controls a wireless connection to an electronic device that is configured to activate a first internal access point of a first connection method or a second internal access point of a second connection method different from the first connection method, and causes a computer to perform a communication connection to the first internal access point based on first connection information of the first internal access point when the first connection information is received from the electronic device, and to perform notification processing when second connection information of the second internal access point is received from the electronic device.

Another aspect of the present disclosure relates to a communication control method for controlling a wireless connection to an electronic device that is configured to activate a first internal access point of a first connection method or a second internal access point of a second connection method different from the first connection method. The communication control method includes performing a communication connection to the first internal access point based on first connection information of the first internal access point when the first connection information is received from the electronic device, and performing notification processing when second connection information of the second internal access point is received from the electronic device.

BRIEF DESCRIPTION OF THE DRAWINGS

FIG. 1 is a diagram illustrating a connection method of wireless communication of a temporary connection.

FIG. 2 is a diagram illustrating another connection method of the wireless communication of the temporary connection.

DESCRIPTION OF EXEMPLARY EMBODIMENTS

Figure 3:
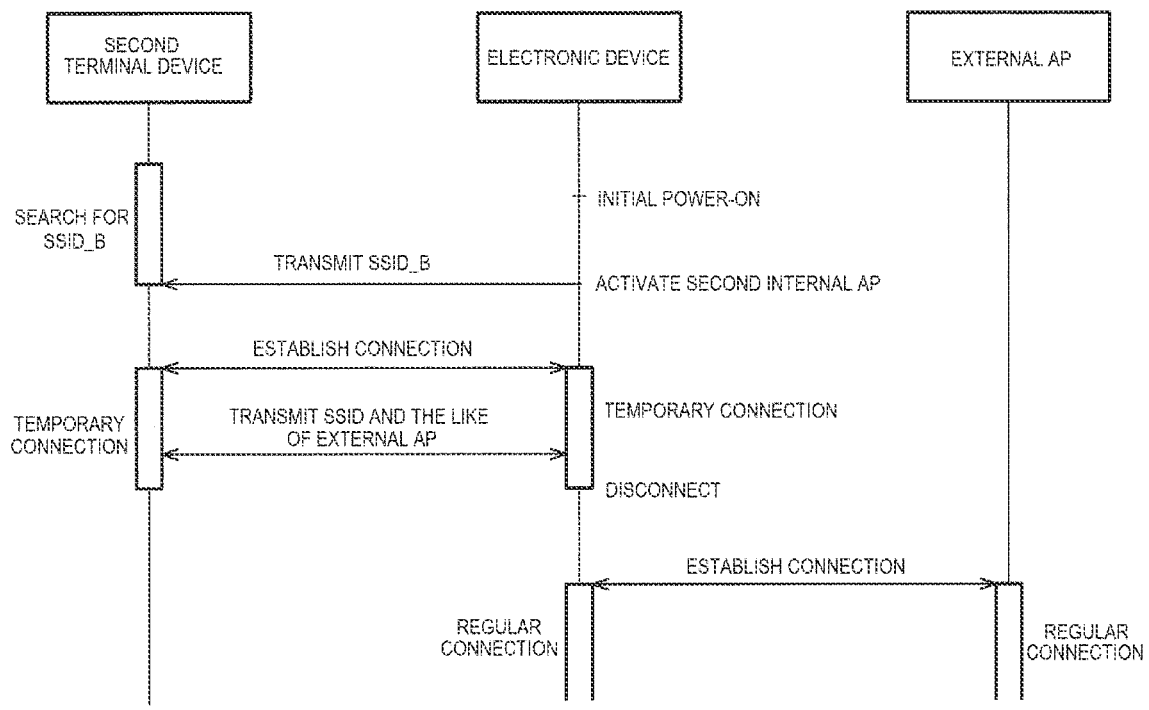
FIG. 3 is a processing flow of communication control in a second system.

Hereinafter, preferred embodiments of the present disclosure will be described in detail. The present embodiment to be described below does not unduly limit contents described in the claims, and not all configurations described in the present embodiment are necessarily essential constituent elements.

1. Connection Method of Wireless Communication of Temporary Connection

FIGS. 1 and 2 are diagrams illustrating connection methods of wireless communication of a temporary connection. In the drawings and the like, an access point is appropriately abbreviated as AP.

In a first system illustrated in FIG. 1, a first terminal device is a terminal device that is temporarily connected to an electronic device by a first connection method. In a second system illustrated in FIG. 2, a second terminal device is a terminal device that is temporarily connected to an electronic device by a second connection method different from the first connection method. Although the electronic devices are regularly connected to external access points, connection methods of the regular connection may be the same in both the first system and the second system.

The first terminal device is, for example, a PC, and the second terminal device is, for example, a portable information processing terminal. The PC is an abbreviation for personal computer. In addition, the first terminal device and the second terminal device are not limited thereto, and may be any terminal device that supports wireless communication. The electronic device is, for example, a printing device, and may be any electronic device having an access point for the wireless communication. Hereinafter, an access point built in the electronic device is referred to as an internal access point, and an access point provided outside the electronic device is referred to as an external access point. The electronic device of FIG. 1 and the electronic device of FIG. 2 are assumed to be of, for example, the same model, and may be electronic devices capable of activating the same internal access point. The external access point is, for example, an access point built in a router or the like that relays between networks.

The temporary connection is a wireless communication connection that is temporarily used by a terminal device to perform connection setting of a regular connection on an electronic device. The wireless communication is assumed to be Wi-Fi (registered trademark), and may be wireless communication by which a terminal device is connected to an access point specified by ID information or the like. In Wi-Fi, the ID information is an SSID. The SSID is an abbreviation for service set identifier. The expression "the connection method is different" means that an internal access point of a connection destination is different. As will be described later, the internal access point is implemented with a software AP, and the internal access point is different depending on which software AP among a plurality of software APs is activated by the electronic device. The first connection method is a method for establishing communication by using, for example, the SSID and a password, and the second connection method is a method for establishing communication by using the SSID without using, for example, a password. The password is also referred to as an encryption key. In addition, the first connection method and the second connection method are not limited to the above as long as the internal access points of the connection destination are different.

FIG. 3 is a processing flow of communication control in the second system of FIG. 2. The electronic device is configured to be capable of activating a first internal access point or a second internal access point, and is assumed to activate the second internal access point due to default setting at the time of initial power-on. The second internal access point is an access point for performing a temporary connection by a second connection method. The electronic device transmits a beacon signal including an SSID_B from the second internal access point. The SSID_B is an SSID that identifies the second internal access point.

The second terminal device first searches for the SSID_B when a procedure of the temporary connection by the second connection method is started. For example, when the second terminal device is a portable information processing terminal, application software for controlling the electronic device from the portable information processing terminal is installed in the portable information processing terminal. When a user activates the application software and performs an operation to start a setting procedure of wireless communication, the application software starts the procedure of the temporary connection.

The second terminal device establishes wireless communication of a temporary connection to the second internal access point when the SSID_B transmitted from the electronic device is found. The second terminal device transmits an SSID and a password of the external access point to the electronic device through the wireless communication of the temporary connection. When the SSID and the password of the external access point are received, the electronic device disconnects the temporary connection, and establishes a regular connection to the external access point by using the received SSID and password. In the regular connection, the electronic device is a terminal side. The electronic device can be connected to an external network such as the Internet by the regular connection to the external access point.

Similarly, the second terminal device is also connected to the external access point by wireless communication. After the electronic device is regularly connected to the external access point, the second terminal device and the electronic device can communicate with each other via the external access point, and each of the second terminal device and the electronic device can be connected to the external network via the external access point.

Figure 4:
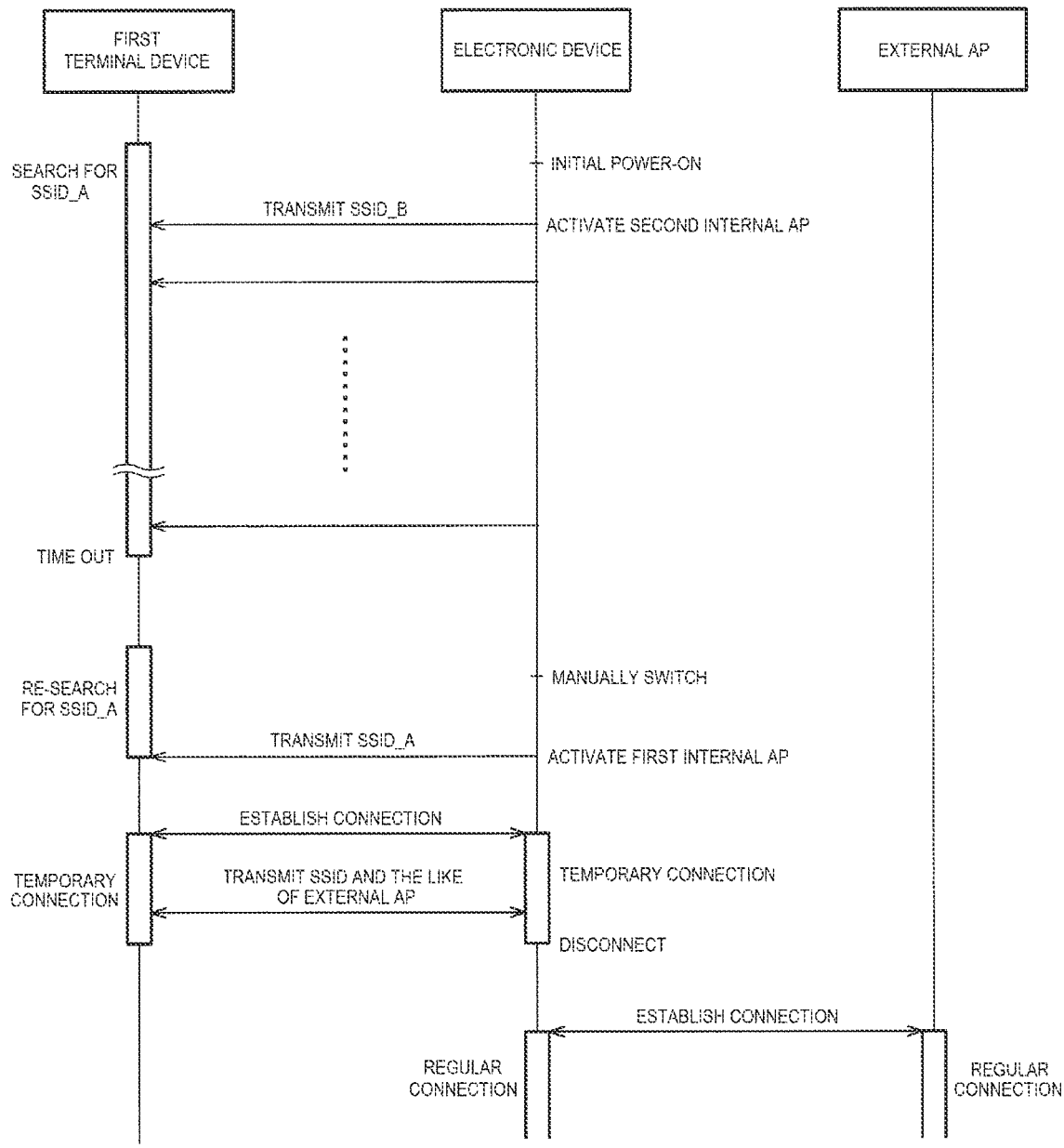
FIG. 4 is a processing flow of communication control in a first system in a case where communication control of the present embodiment is not used.

FIG. 4 is a processing flow of communication control in the first system of FIG. 1 in a case where communication control of the present embodiment is not used. Hereinafter, problems arising when the communication control of the present embodiment is not used will be described with reference to FIG. 4.

Unlike the second terminal device, the first terminal device is a terminal device that performs the temporary connection by the first connection method. The first terminal device first searches for an SSID_A when a procedure of the temporary connection by the first connection method is started. The SSID_A is an SSID that identifies the first internal access point. For example, when the first terminal device is a PC, software for controlling the electronic device from the PC is installed in the PC. When the user activates the software and performs an operation to start a setting procedure of wireless communication, the software starts the procedure of the temporary connection.

The electronic device activates the second internal access point due to the default setting at the time of initial power-on, and transmits the beacon signal including the SSID_B from the second internal access point. Since the first terminal device cannot find the SSID_A, the first terminal device continues to search for the SSID_A until the search is timed out.

When the search is timed out, the first terminal device notifies the user of, for example, manual switching of the internal access point. The user manually switches the electronic device from the second internal access point to the first internal access point. The first internal access point is an access point for performing a temporary connection by the first connection method. The electronic device activates the first internal access point and transmits a beacon signal including the SSID_A from the first internal access point.

The first terminal device re-searches the SSID_A, and establishes wireless communication of a temporary connection to the first internal access point when the SSID_A transmitted from the electronic device is found. The first terminal device transmits the SSID and the password of the external access point to the electronic device through the wireless communication of the temporary connection. When the SSID and the password of the external access point are received, the electronic device disconnects the temporary connection, and establishes a regular connection to the external access point by using the received SSID and password.

Figure 5:
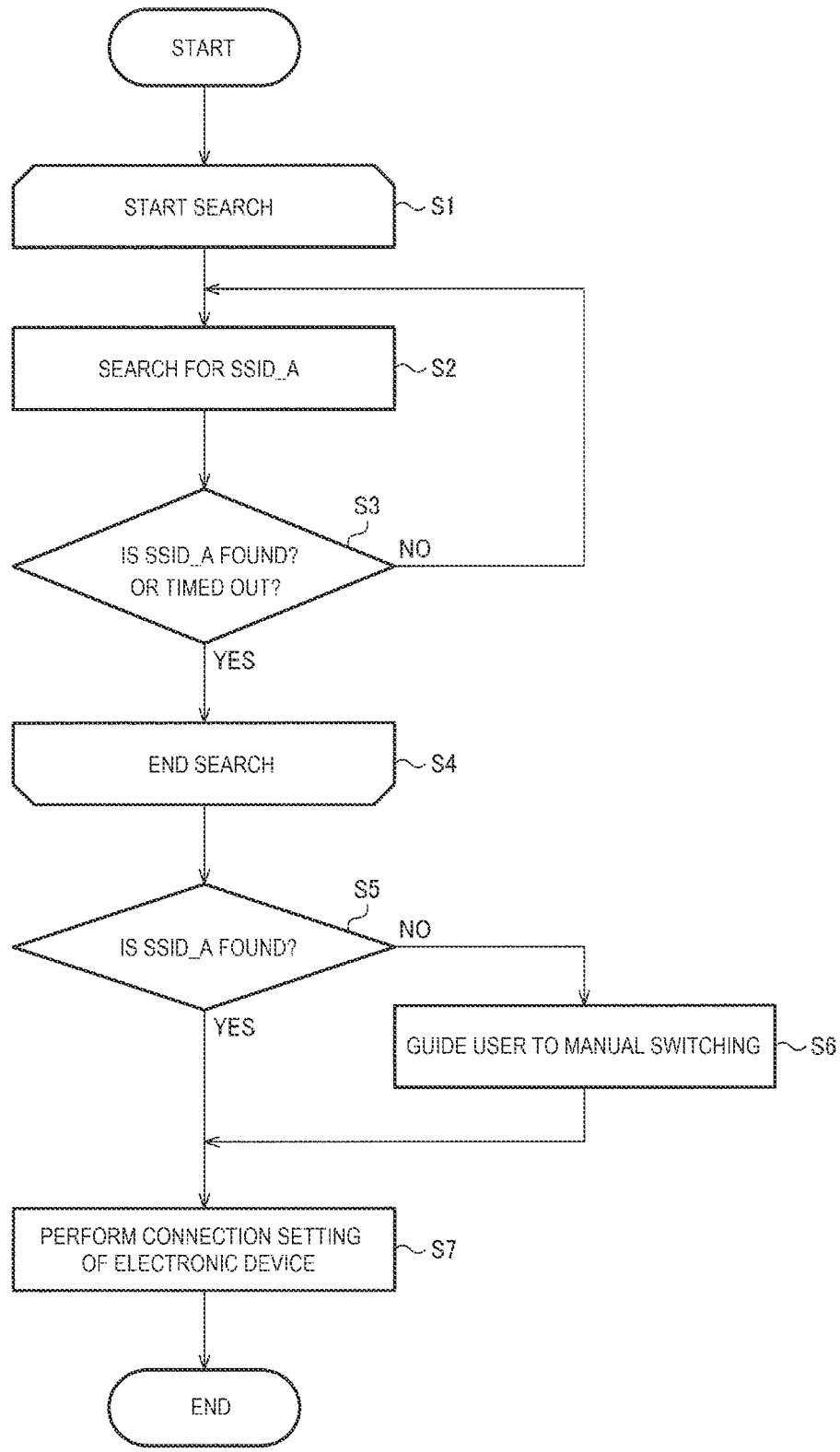
FIG. 5 is a flowchart of processing performed by a processing unit of a first terminal device.

FIG. 5 is a flowchart of processing performed by a processing unit of the first terminal device in the processing flow of FIG. 4.

In step S1, the processing unit starts loop processing of searching for the SSID_A. In step S2, the processing unit searches for the SSID_A. Specifically, the processing unit searches for whether the SSID_A is included in a beacon signal received from the electronic device. In step S3, the processing unit determines whether the SSID_A has been found and whether the search has been timed out.

When the SSID_A is not found and the search is not timed out, the processing unit returns to step S2 and continues the loop. When the SSID_A is found or the search is timed out, the processing unit ends the loop processing of searching in step S4.

In step S5, the processing unit determines whether the SSID_A has been found in the loop processing. When the SSID_A is found, the processing unit proceeds to step S7. When the SSID_A is not found, in step S6, the processing unit guides the user to the manual switching to the first internal access point, and advances the processing to step S7.

In the loop processing, when the SSID_A is not found, the loop processing is not ended until the search is timed out, and thus step S6 is executed when the search is timed out.

In step S7, the processing unit performs connection setting of the electronic device. Specifically, the processing unit executes the same processing as in steps S1 to S5. Since the electronic device activates the first internal access point by the manual switching, the SSID_A is found in the loop processing. The processing unit establishes a temporary connection by using the SSID_A, and transmits an SSID and a password for a regular connection to the electronic device via the temporary connection.

As described above, when the first connection method used for the temporary connection by the first terminal device is different from the second connection method selected by the electronic device, the usability for the user is deteriorated. In the above example, the first terminal device searches for the first internal access point, but the user does not know that the electronic device is activating the second internal access point, and thus the user is kept waiting until the search is timed out.

2. System, Terminal Device, and Electronic Device

Figure 6:
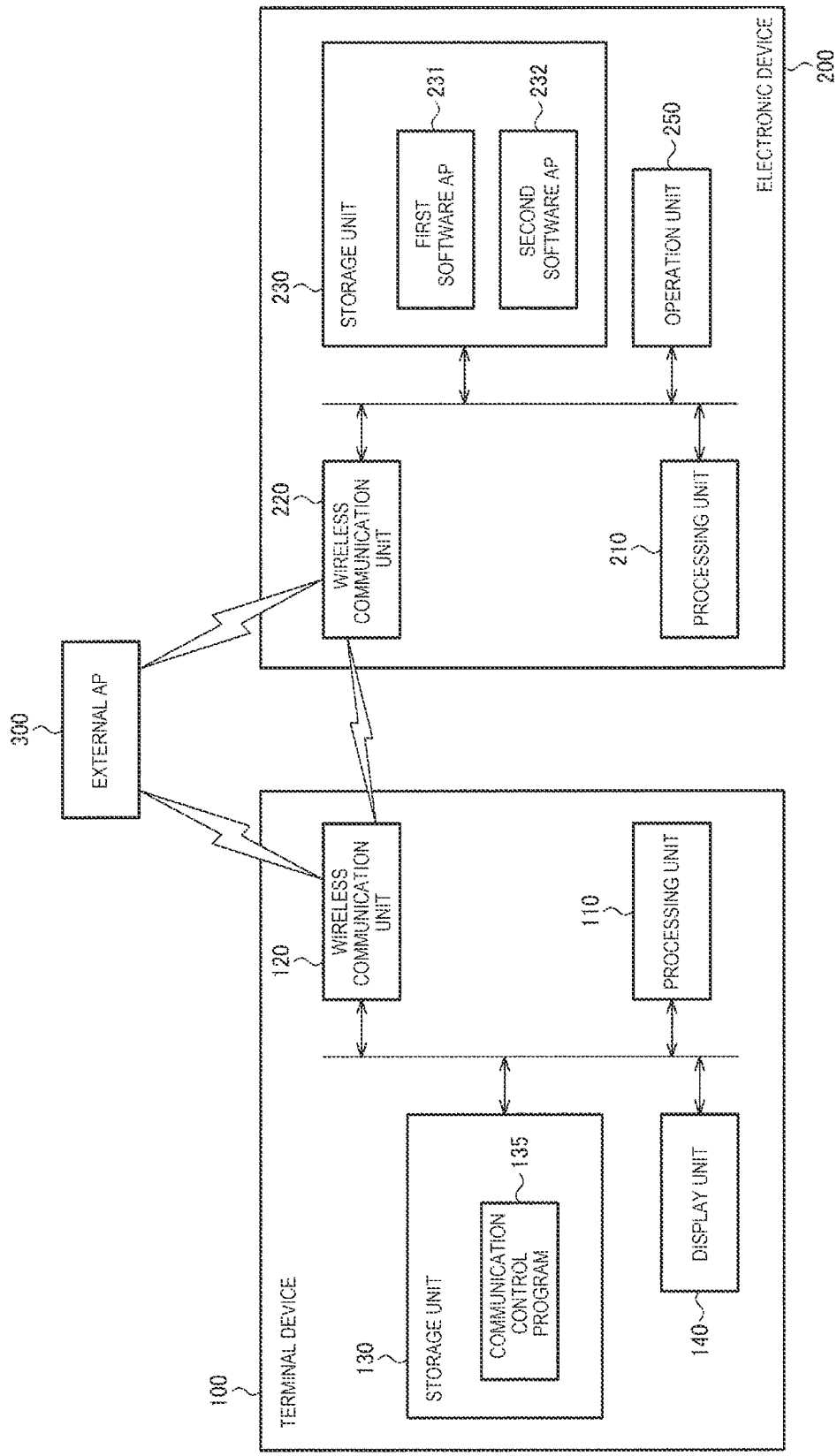
FIG. 6 is a configuration example of a system of the present embodiment.

FIG. 6 is a configuration example of a system 10 of the present embodiment. The system 10 includes a terminal device 100, an electronic device 200, and an external access point 300.

The terminal device 100 performs, as a terminal, wireless communication to a first internal access point of the electronic device 200 in a temporary connection, and performs, as a terminal, wireless communication to the external access point 300 in a regular connection. That is, the terminal device 100 corresponds to the first terminal device among the first terminal device using the temporary connection of the first connection method illustrated in FIG. 1 and the second terminal device using the temporary connection of the second connection method illustrated in FIG. 2. The terminal device 100 is an information processing device, a portable information processing terminal, or the like. The terminal device 100 includes a processing unit 110, a wireless communication unit 120, a storage unit 130, and a display unit 140.

The storage unit 130 is a storage device such as a semiconductor memory or a magnetic storage device. The semiconductor memory may be a volatile memory such as a RAM, a nonvolatile memory such as an EEPROM, or both. The RAM is an abbreviation for random access memory, and the EEPROM is an abbreviation for electrically erasable programmable read only memory. The storage unit 130 stores a communication control program 135. In addition, the storage unit 130 may function as a working memory of the processing unit 110.

The wireless communication unit 120 performs wireless communication to the external access point 300 and an internal access point of the electronic device 200. The wireless communication unit 120 is also referred to as a wireless communication circuit or a wireless communication device. The wireless communication unit 120 includes, for example, a transmission unit, a reception unit, and an antenna. The transmission unit includes, for example, a modulation circuit that modulates a carrier wave based on transmission data, and a drive circuit that drives the antenna with the modulated carrier wave. The reception unit includes, for example, a reception circuit that receives a reception signal from the antenna, and a demodulation circuit that demodulates reception data from the reception signal. The wireless communication is assumed to be Wi-Fi, and may be wireless communication by which the terminal device is connected to an access point specified by ID information or the like.

The processing unit 110 performs communication control of the wireless communication by executing the communication control program 135. The wireless communication unit 120 communicates with the access point based on the communication control from the processing unit 110. The processing unit 110 is also referred to as a processing circuit or a processing device. The processing unit 110 is a processor such as a CPU, a microcomputer, or a DSP. Alternatively, the processing unit 110 may be an ASIC, an FPGA, or the like. The CPU is an abbreviation for central processing unit. The DSP is an abbreviation for digital signal processor. The ASIC is an abbreviation for application specific integrated circuit. The FPGA is an abbreviation for field programmable gate array.

The display unit 140 displays an image based on display data transmitted from the processing unit 110. For example, when the processing unit 110 performs notification processing to a user, the display unit 140 displays an image including notification contents. In addition, a notification means is not limited to image display, and may be audio, light, vibration, or the like. The display unit 140 is also referred to as a display or a monitor.

The electronic device 200 functions as an internal access point for the temporary connection, and performs, as a terminal, wireless communication to the external access point 300 in the regular connection. The electronic device 200 includes a processing unit 210, a wireless communication unit 220, a storage unit 230, and an operation unit 250.

The storage unit 230 is a storage device such as a semiconductor memory or a magnetic storage device. The storage unit 230 stores a first software AP 231 and a second software AP 232. In addition, the storage unit 230 may function as a working memory of the processing unit 210. The first software AP 231 is a program in which functions of the first internal access point are described, and the second software AP 232 is a program in which functions of the second internal access point are described.

The wireless communication unit 220 performs wireless communication to the external access point 300 and the wireless communication unit 120 of the terminal device 100. The wireless communication unit 220 includes, for example, a transmission unit, a reception unit, and an antenna that have the same configurations as those of the wireless communication unit 120. The wireless communication unit is also referred to as a wireless communication circuit or a wireless communication device.

The processing unit 210 causes the wireless communication unit 220 to function as the first internal access point by executing the first software AP 231. The processing unit 210 causes the wireless communication unit 220 to function as the second internal access point by executing the second software AP 232. The wireless communication unit 220 functions as the first internal access point or the second internal access point depending on the software selected by the processing unit 210, but cannot function simultaneously as the first internal access point and the second internal access point. When the connection setting of the regular connection is not performed, such as at the time of initial power-on, the processing unit 210 automatically activates the internal access point for the temporary connection. In the default setting, the processing unit 210 activates the second internal access point.

In the regular connection, the processing unit 210 causes the wireless communication unit 220 to function as a terminal-side communication unit for the external access point 300. The processing unit 210 is also referred to as a processing circuit or a processing device. The processing unit 210 is a processor such as a CPU, a microcomputer, or a DSP. Alternatively, the processing unit 210 may be an ASIC, an FPGA, or the like.

The external access point 300 is a device for transmitting and receiving radio waves of the wireless communication, and is built in or connected to a router that relays between networks. The router relays between a LAN, to which the terminal device 100 and the electronic device 200 are connected, and an external network such as the Internet. The LAN is an abbreviation for local area network. The terminal device 100 and the electronic device 200 can access the external network via the router by connecting to the external access point 300 by wireless communication.

Hereinafter, operations of the terminal device 100 of the present embodiment will be described. The more detailed operations will be described later with reference to FIGS. 7 and 8.

The terminal device 100 includes the wireless communication unit 120 that performs a wireless connection to the electronic device 200, and the processing unit 110 that performs communication control of the wireless communication unit 120. The electronic device 200 is capable of activating the first internal access point of the first connection method or the second internal access point of the second connection method different from the first connection method. The processing unit 110 performs a communication connection to the first internal access point based on first connection information of the first internal access point when the first connection information is received from the electronic device 200. The processing unit 110 performs notification processing when second connection information of the second internal access point is received from the electronic device 200.

According to the present embodiment, when the electronic device 200 activates the second internal access point, that is, when the first connection method used for the temporary connection by the first terminal device is different from the second connection method selected by the electronic device, the notification processing for a user is performed. Accordingly, it is possible for the user to take measures such as the manual switching of the internal access point without waiting until the time out, thereby improving convenience for the user. Specifically, even when the second internal access point is activated due to the default setting at the time of initial power-on of the electronic device 200, the user can take measures such as the manual switching since the notification processing is performed.

In addition, the first connection method is a method for establishing communication by using, for example, an SSID and a password, and the second connection method is a method for establishing communication by using the SSID without using, for example, the password. However, the connection method is distinguished by a wireless communication standard, a radio wave band used for communication, a communication speed, presence or absence of encryption, an encryption method, or the like. That is, the second connection method is required to be different from the first connection method in at least one of the wireless communication standard, the radio wave band used for communication, the communication speed, the presence or absence of encryption, the encryption method, and the like.

The first connection information is information used when the wireless communication unit 120 establishes a communication connection to the first internal access point. The second connection information is information used when the wireless communication unit 120 establishes a communication connection to the second internal access point. The connection information includes ID information such as an SSID that specifies an internal access point. In addition, the connection information may include information on wireless communication standards, information on encryption methods, or the like.

In addition, in the present embodiment, the notification processing is processing of prompting a connection method of the electronic device 200 to be changed to the first connection method. Alternatively, the notification processing may be processing of notifying that the second connection information was received.

According to the present embodiment, the user can manually switch the connection method from the second connection method to the first connection method when receiving a notification prompting the user to change the connection method to the first connection method or a notification indicating that the second connection information was received.

In addition, the switching of the connection method is executed by the user performing an operation on the operation unit 250 provided in the electronic device 200. The operation unit 250 is also referred to as an operation device. For example, a button is provided as the operation unit 250, and the processing unit 210 of the electronic device 200 activates the first internal access point when a long-press operation on the button is detected. Alternatively, a touch panel may be provided as the operation unit 250 together with a display, and the processing unit 210 of the electronic device 200 may activate the first internal access point when a switching operation by the touch panel is detected.

In addition, in the present embodiment, the processing unit 110 performs second notification processing of notifying a successful connection when the communication connection to the first internal access point is performed based on the first connection information received from the electronic device 200, after performing first notification processing that is the notification processing.

According to the present embodiment, by notifying the user of a successful connection of a temporary connection, the user can know that the internal access point was correctly switched by the manual switching operation of the user and that the wireless communication of the temporary connection to the electronic device 200 was established by the terminal device 100.

In addition, in the present embodiment, the processing unit 110 transmits connection information of the external access point 300 to the electronic device 200 by the wireless communication of the first connection method after performing the communication connection to the first internal access point. The connection information of the external access point 300 is information to be used when the wireless communication unit 220 of the electronic device 200 establishes a communication connection to the external access point 300.

In addition, in a case where the above notification processing is performed, the processing unit 110 performs the communication connection to the first internal access point based on the first connection information when the first connection information is received from the electronic device 200, after performing the notification processing. Then, the processing unit 110 transmits the connection information of the external access point 300 to the electronic device 200 by the wireless communication of the first connection method after performing the communication connection to the first internal access point.

According to the present embodiment, the connection information of the external access point 300 is transmitted from the terminal device 100 to the electronic device 200 via the temporary connection of the first connection method. Accordingly, the electronic device 200 can establish the communication connection to the external access point 300 by using the connection information.

In addition, in the present embodiment, the first connection information includes a first identifier of the first internal access point. The second connection information includes a second identifier of the second internal access point. The processing unit 110 performs search processing of searching for the first identifier and the second identifier.

According to the present embodiment, the processing unit 110 can determine, by searching for the first identifier, whether the first connection information of the first internal access point has been received from the electronic device 200. In addition, the processing unit 110 can determine, by searching for the second identifier, whether the second connection information of the second internal access point has been received from the electronic device 200. Then, the processing unit 110 can determine, by simultaneously searching for the first identifier and the second identifier, which of the first internal access point and the second internal access point has been activated in the electronic device 200. Accordingly, when the second internal access point has been activated in the electronic device 200, the processing unit 110 can notify the user.

In addition, in the present embodiment, when the second identifier is found in the search processing, the processing unit 110 performs the notification processing even before a time out of the search processing.

According to the present embodiment, when the second internal access point is activated in the electronic device 200, the processing unit 110 notifies the user before the search processing is timed out, and thus the user does not have to wait until the time out, thereby improving the convenience for the user.

In addition, in the present embodiment, the processing unit 110 performs the communication connection to the first internal access point based on the first connection information when the first identifier is found in the search processing. The processing unit 110 performs communication connection to the second internal access point based on the second connection information when the second identifier is found in the search processing.

According to the present embodiment, when the first identifier is found, the processing unit 110 can determine that the first connection information of the first internal access point has been received, and perform the communication connection to the first internal access point. In addition, when the second identifier is found, the processing unit 110 can determine that the second connection information of the second internal access point has been received, and perform the notification processing.

In addition, in the present embodiment, the first connection method is Wi-Fi Direct, and the second connection method is a connection method different from the Wi-Fi Direct.

It is assumed that a first terminal device using the Wi-Fi Direct for the temporary connection and a second terminal device using a connection method different from the Wi-Fi Direct for the temporary connection are mixed, and that the electronic device was activating a second internal access point of a connection method different from the Wi-Fi Direct. According to the present embodiment, even in such a case, since the terminal device 100 corresponding to the first terminal device performs the notification processing when the second connection information of the second internal access point is received, the user can take measures such as the manual switching.

In addition, the Wi-Fi Direct is a type of Wi-Fi communication by which wireless communication between the terminal device and the electronic device is performed by the electronic device serving as an access point using the software AP. The Wi-Fi Direct uses the SSID, which is an identifier, and the password, which is an encryption key, as the connection information. As an example, the second connection method is a type of Wi-Fi communication using the software AP as in the Wi-Fi Direct, but is a communication method using only the SSID without using the password.

In addition, the above embodiment may be implemented as a program as follows. That is, the program controls the wireless connection to the electronic device 200 that is capable of activating the first internal access point of the first connection method or the second internal access point of the second connection method different from the first connection method. The program causes a computer to perform the communication connection to the first internal access point based on the first connection information of the first internal access point when the first connection information is received from the electronic device 200. In addition, the program causes the computer to execute the notification processing when the second connection information of the second internal access point is received from the electronic device 200. In FIG. 6, the communication control program 135 corresponds to the present program.

In addition, the above program may be stored in a non-transitory information storage medium that is a computer-readable medium. The information storage medium can be implemented with, for example, an optical disk, a memory card, an HDD, a semiconductor memory, or the like. The semiconductor memory is, for example, a ROM or a nonvolatile memory. The processing unit 110 of the terminal device 100 performs various types of processing of the present embodiment based on programs and data stored in the information storage medium.

Figure 7:
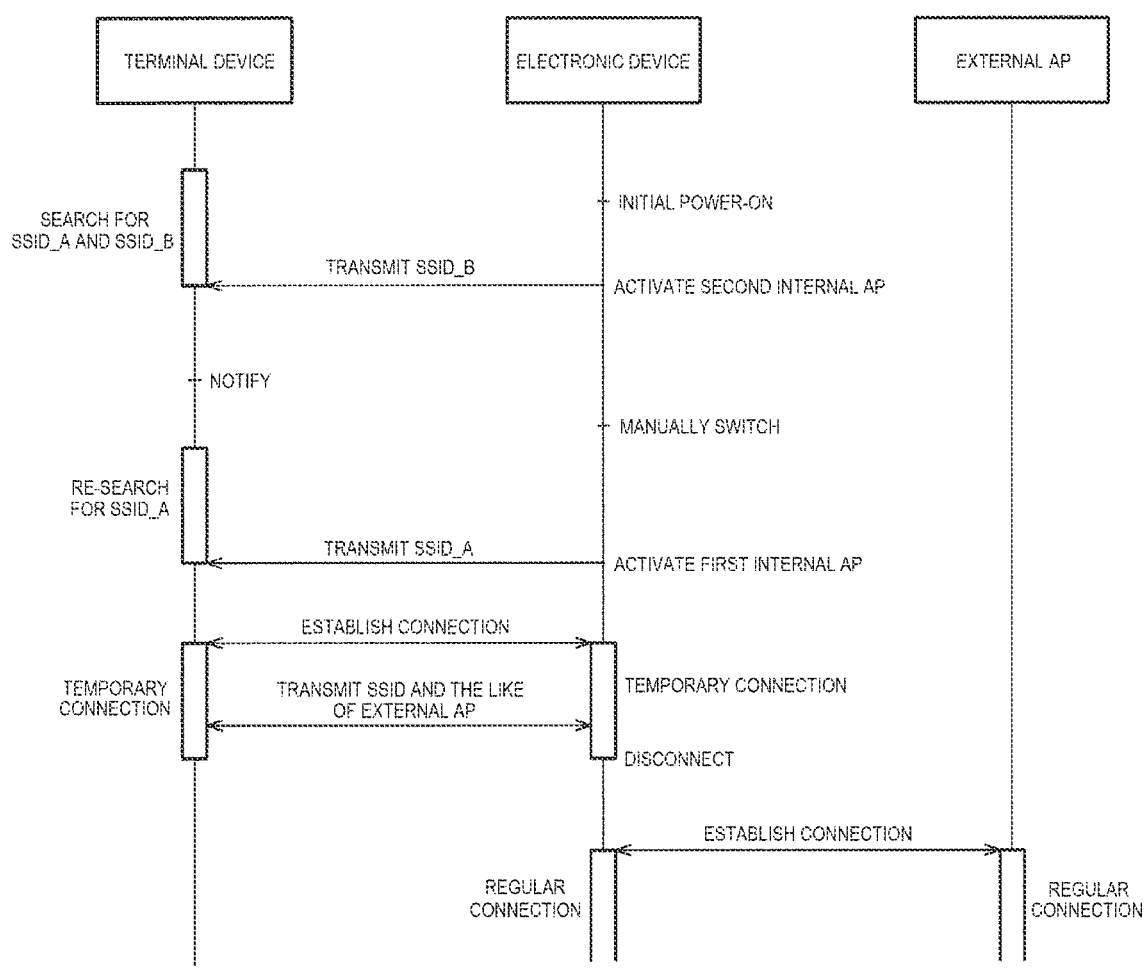
FIG. 7 is a processing flow of communication control in the system of the present embodiment.

Hereinafter, a detailed operation of the system 10 will be described. FIG. 7 is a processing flow of communication control in the system 10 of the present embodiment.

The processing unit 210 of the electronic device 200 activates the second internal access point due to the default setting at the time of initial power-on of the electronic device 200. The wireless communication unit 220 functioning as the second internal access point transmits the beacon signal including the SSID_B. The SSID_B is the second identifier.

The processing unit 110 of the terminal device 100 searches for the SSID_A and the SSID_B when the procedure of the temporary connection of the first connection method is started. The SSID_A is the first identifier. The wireless communication unit 120 receives the beacon signal including the SSID_B. The processing unit 110 performs the notification processing when reception of the SSID_B is confirmed.

The user receives the notification, and manually switches the electronic device 200 from the second internal access point to the first internal access point. The processing unit 210 of the electronic device 200 activates the first internal access point. The wireless communication unit 220 functioning as the first internal access point transmits the beacon signal including the SSID_A.

The processing unit 110 of the terminal device 100 re-searches for the SSID_A. The wireless communication unit 120 receives the beacon signal including the SSID_A. The processing unit 110 establishes the wireless communication of the temporary connection to the first internal access point when reception of the SSID_A is confirmed. The processing unit 110 transmits the SSID and the password of the external access point 300 to the electronic device 200 through the wireless communication of the temporary connection. When the SSID and the password of the external access point 300 are received, the processing unit 210 of the electronic device 200 disconnects the temporary connection, and establishes a regular connection to the external access point 300 by using the received SSID and password.

Similarly, the terminal device 100 is also connected to the external access point 300 by wireless communication. After the electronic device 200 is regularly connected to the external access point 300, the terminal device 100 and the electronic device 200 can communicate with each other via the external access point 300, and each of the terminal device 100 and the electronic device 300 can be connected to an external network via the external access point 300.

Figure 8:
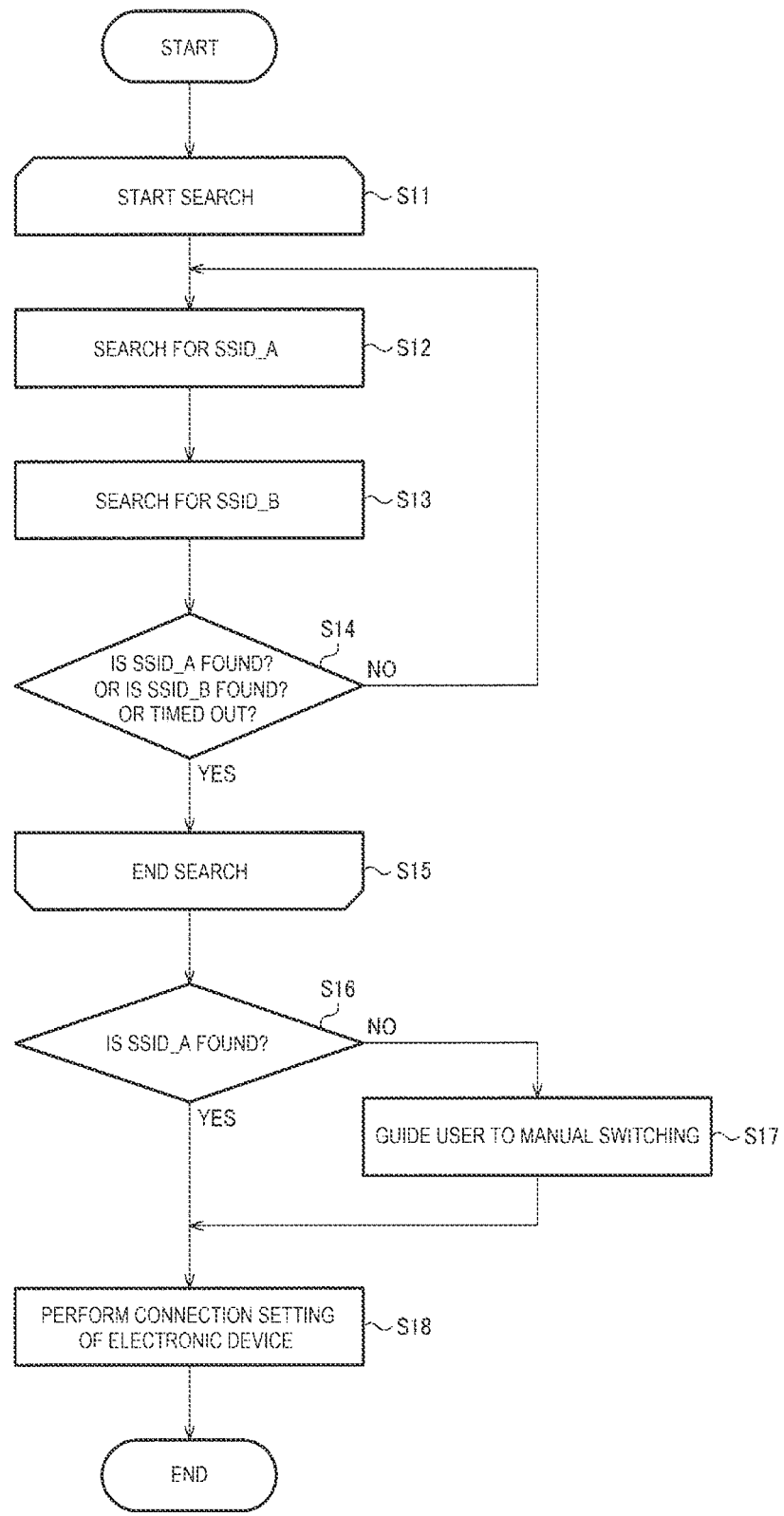
FIG. 8 is a flowchart of processing performed by a processing unit of a terminal device.

FIG. 8 is a flowchart of the processing performed by the processing unit 110 of the terminal device 100 in the processing flow of FIG. 7.

In step S11, the processing unit 110 starts loop processing of searching for the SSID_A. In step S12, the processing unit 110 searches for the SSID_A. Specifically, the processing unit 110 searches for whether the SSID_A is included in the beacon signal received from the electronic device 200. In step S13, the processing unit 110 searches for the SSID_B. Specifically, the processing unit 110 searches for whether the SSID_A is included in the beacon signal received from the electronic device 200. In step S14, the processing unit 110 determines whether the SSID_A has been found, whether the SSID_B has been found, and whether the search has been timed out.

When the SSID_A and the SSID_B are not found and the search is not timed out, the processing unit 110 returns to step S12 and continues the loop. When the SSID_A is found, the SSID_B is found, or the search is timed out, the processing unit 110 ends the loop processing of searching in step S15.

In step S16, the processing unit 110 determines whether the SSID_A has been found in the loop processing. When the SSID_A is found, the processing unit 110 proceeds to step S18. When the SSID_A is not found, in step S17, the processing unit 110 guides the user to the manual switching to the first internal access point, and the process proceeds to step S18.

A case where the SSID_A is not found in the loop processing means that the SSID_B is found or that the search is timed out. That is, when the SSID_B is found in the loop processing, the user is guided to the manual switching without waiting until the time-out. This is implemented by searching for both the SSID_A and the SSID_B in the loop processing.

In step S18, the processing unit 110 performs connection setting of the electronic device 200. Specifically, the processing unit 110 executes the same processing as in steps S11 to S16. Since the electronic device activates the first internal access point by the manual switching, the SSID_A is found in the loop processing. The processing unit 110 establishes the temporary connection by using the SSID_A, and transmits the SSID and the password of the regular connection to the electronic device 200 via the temporary connection.

The terminal device of the present embodiment described above includes the wireless communication unit that performs the wireless connection to the electronic device, and the processing unit that performs the communication control of the wireless communication unit. The electronic device is capable of activating the first internal access point of the first connection method or the second internal access point of the second connection method different from the first connection method. The processing unit performs the communication connection to the first internal access point based on the first connection information of the first internal access point when the first connection information is received from the electronic device, and performs the notification processing when the second connection information of the second internal access point is received from the electronic device.

According to the present embodiment, when the electronic device activates the second internal access point, that is, when the first connection method used for the temporary connection by the first terminal device is different from the second connection method selected by the electronic device, the notification processing for the user is performed. Accordingly, it is possible for the user to take measures such as the manual switching of the internal access point without waiting until the time out, thereby improving the convenience for the user.

In addition, in the present embodiment, the notification processing may be processing of prompting the connection method of the electronic device to be changed to the first connection method.

According to the present embodiment, the user can manually switch the connection method from the second connection method to the first connection method when receiving the notification prompting the user to change the connection method to the first connection method.

In addition, in the present embodiment, the processing unit may perform the second notification processing of notifying the successful connection when the communication connection to the first internal access point is performed based on the first connection information received from the electronic device, after performing the first notification processing that is the notification processing.

According to the present embodiment, by notifying the user of the successful connection of the temporary connection, the user can know that the internal access point was correctly switched by the manual switching operation of the user and that the wireless communication of the temporary connection to the electronic device was established by the terminal device.

In addition, in the present embodiment, the processing unit transmits the connection information of the external access point to the electronic device by the wireless communication of the first connection method after performing the communication connection to the first internal access point.

According to the present embodiment, the connection information of the external access point is transmitted from the terminal device to the electronic device via the temporary connection of the first connection method. Accordingly, the electronic device can establish the communication connection to the external access point by using the connection information.

In the present embodiment, the processing unit may perform the communication connection to the first internal access point based on the first connection information when the first connection information is received from the electronic device, after performing the notification processing. The processing unit transmits the connection information of the external access point to the electronic device by the wireless communication of the first connection method after performing the communication connection to the first internal access point.

According to the present embodiment, after the internal access point of the electronic device is switched to the first internal access point, the terminal device is connected to the first internal access point, and the connection information of the external access point is transmitted from the terminal device to the electronic device via the temporary connection of the first connection method. Accordingly, the electronic device can establish the communication connection to the external access point by using the connection information.

In addition, in the present embodiment, the first connection information may include the first identifier of the first internal access point. The second connection information may include the second identifier of the second internal access point. The processing unit may perform the search processing of the first identifier and the second identifier.

According to the present embodiment, the processing unit can determine, by searching for the first identifier and the second identifier, which of the first internal access point and the second internal access point has been activated in the electronic device. Accordingly, when the second internal access point is activated in the electronic device, the processing unit can notify the user.

In addition, in the present embodiment, the processing unit may perform the communication connection to the first internal access point based on the first connection information when the first identifier is found in the search processing. The processing unit may perform the notification processing when the second identifier is found in the search processing.

According to the present embodiment, when the first identifier is found, the processing unit can determine that the first connection information of the first internal access point has been received, and perform the communication connection to the first internal access point. In addition, when the second identifier is found, the processing unit can determine that the second connection information of the second internal access point has been received, and perform the notification processing.

In addition, in the present embodiment, when the second identifier is found in the search processing, the processing unit may perform the notification processing even before the time out of the search processing.

According to the present embodiment, when the second internal access point is activated in the electronic device, the processing unit notifies the user before the search processing is timed out, and thus the user does not have to wait until the time-out, thereby improving the convenience for the user.

In addition, in the present embodiment, the notification processing may be the processing of notifying that the second connection information was received.

According to the present embodiment, the user can manually switch the connection method from the second connection method to the first connection method when receiving the notification indicating that the second connection information was received.

In addition, in the present embodiment, the first connection method may be the Wi-Fi Direct. The second connection method may be a connection method different from the Wi-Fi Direct.

It is assumed that the first terminal device using the Wi-Fi Direct for the temporary connection and the second terminal device using the connection method different from the Wi-Fi Direct for the temporary connection are mixed, and that the electronic device was activating the second internal access point of the connection method different from the Wi-Fi Direct. According to the present embodiment, even in such a case, since the terminal device of the present embodiment corresponding to the first terminal device performs the notification processing when the second connection information of the second internal access point is received, the user can take measures such as the manual switching.

In addition, the program of the present embodiment controls the wireless connection to the electronic device that is capable of activating the first internal access point of the first connection method or the second internal access point of the second connection method different from the first connection method. The program causes a computer to perform the communication connection to the first internal access point based on the first connection information of the first internal access point when the first connection information is received from the electronic device, and perform the notification processing when the second connection information of the second internal access point is received from the electronic device.

A communication control method of the present embodiment controls the wireless connection to the electronic device that is capable of activating the first internal access point of the first connection method or the second internal access point of the second connection method different from the first connection method. The communication control method includes performing the communication connection to the first internal access point based on the first connection information of the first internal access point when the first connection information is received from the electronic device, and performing the notification processing when the second connection information of the second internal access point is received from the electronic device.

Although the present embodiment has been described in detail as described above, it will be readily apparent to those skilled in the art that many modifications may be made without departing substantially from novel matters and effects of the present disclosure. Therefore, all such modifications are intended to be included within the scope of the present disclosure. For example, a term cited with a different term having a broader meaning or the same meaning at least once in the specification or in the drawings can be replaced with the different term in any place in the specification or in the drawings. In addition, all combinations of the present embodiment and the modifications are also included in the scope of the present disclosure. Configurations, operations, and the like of the terminal device, the electronic device, the external access point, the system, and the like are not limited to those described in the present embodiment, and various modifications can be made.

What is claimed is:

1. A terminal device comprising:
a wireless communication unit configured to perform a wireless connection to an electronic device; and
a processing unit configured to perform communication control of the wireless communication unit, wherein
the electronic device is configured to:
activate a first internal access point of a first connection method or a second internal access point of a second connection method different from the first connection method, and
the processing unit is configured to:
perform a communication connection to the first internal access point based on first connection information of the first internal access point when the first connection information is received from the electronic device, and
perform notification processing when second connection information of the second internal access point is received from the electronic device.

2. The terminal device according to claim 1, wherein
the notification processing is processing of prompting a connection method of the electronic device to be changed to the first connection method.

3. The terminal device according to claim 1, wherein
the processing unit is configured to:
perform second notification processing of notifying a successful connection when the communication connection to the first internal access point is performed based on the first connection information received from the electronic device, after performing first notification processing that is the notification processing.

4. The terminal device according to claim 1, wherein
the processing unit is configured to:
transmit connection information of an external access point to the electronic device by wireless communication of the first connection method after performing the communication connection to the first internal access point.

5. The terminal device according to claim 1, wherein
the processing unit is configured to:
perform the communication connection to the first internal access point based on the first connection information when the first connection information is received from the electronic device, after performing the notification processing, and transmit connection information of an external access point to the electronic device by wireless communication of the first connection method after performing the communication connection to the first internal access point.

6. The terminal device according to claim 1, wherein
the first connection information includes a first identifier of the first internal access point,
the second connection information includes a second identifier of the second internal access point, and
the processing unit is configured to:
perform search processing of searching for the first identifier and the second identifier.

7. The terminal device according to claim 6, wherein
the processing unit is configured to:
perform the communication connection to the first internal access point based on the first connection information when the first identifier is found in the search processing, and
perform the notification processing when the second identifier is found in the search processing.

8. The terminal device according to claim 6, wherein
the processing unit is configured to:
perform the notification processing even before a time out of the search processing when the second identifier is found in the search processing.

9. The terminal device according to claim 1, wherein
the notification processing is processing of notifying that the second connection information was received.

10. The terminal device according to claim 1, wherein
the first connection method is Wi-Fi Direct, and
the second connection method is a connection method different from the Wi-Fi Direct.

11. A non-transitory computer-readable storage medium storing a program, the program controlling a wireless connection to an electronic device that is configured to activate a first internal access point of a first connection method or a second internal access point of a second connection method different from the first connection method, and causing a computer to:
perform a communication connection to the first internal access point based on first connection information of the first internal access point when the first connection information is received from the electronic device, and
perform notification processing when second connection information of the second internal access point is received from the electronic device.

12. A communication control method for controlling a wireless connection to an electronic device that is configured to activate a first internal access point of a first connection method or a second internal access point of a second connection method different from the first connection method, the communication control method comprising:
performing a communication connection to the first internal access point based on first connection information of the first internal access point when the first connection information is received from the electronic device; and
performing notification processing when second connection information of the second internal access point is received from the electronic device.

* * * * *